United States Patent
Luo et al.

(10) Patent No.: US 12,020,126 B2
(45) Date of Patent: Jun. 25, 2024

(54) AUTOMATED PRESSURE LEVEL DETECTION AND CORRECTION

(71) Applicant: INTERNATIONAL BUSINESS MACHINES CORPORATION, Armonk, NY (US)

(72) Inventors: Deng Xin Luo, Xian (CN); Miao Guo, Beijing (CN); Xiang Yu Yang, Shaanxi (CN); Yi Ming Wang, Xi'an (CN); Yan Yu Zhang, Beijing (CN); Wen Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 17/301,565

(22) Filed: Apr. 8, 2021

(65) Prior Publication Data
US 2022/0327420 A1    Oct. 13, 2022

(51) Int. Cl.
  *G06N 20/00*  (2019.01)
  *E21F 17/00*  (2006.01)
  (Continued)

(52) U.S. Cl.
  CPC ............ *G06N 20/00* (2019.01); *E21F 17/00* (2013.01); *G06N 5/02* (2013.01); *G08B 21/182* (2013.01)

(58) Field of Classification Search
  None
  See application file for complete search history.

(56) References Cited

U.S. PATENT DOCUMENTS

| 7,020,642 B2 * | 3/2006 | Ferguson ............ G06F 18/2433 700/53 |
| 10,655,465 B2 | 5/2020 | Lu |

(Continued)

FOREIGN PATENT DOCUMENTS

| CN | 104656124 A | 5/2015 |
| CN | 107795336 A | 3/2018 |

(Continued)

OTHER PUBLICATIONS

PCT ISR & WO, International application No. PCT/EP2022/058856, date of mailing: Jul. 22, 2022, 12 pages.

(Continued)

*Primary Examiner* — Maikhanh Nguyen
(74) *Attorney, Agent, or Firm* — Schmeiser, Olsen & Watts, LLP; Edward Wixted

(57) ABSTRACT

A method, system, and computer program product for implementing automated pressure level detection and correction is provided. The method includes retrieving from sensors, measurement attributes associated with geological conditions occurring during a mining process. Subsequently, threshold levels configured to activate an alarm associated with measurement attributes exceeding the threshold levels are determined and code is executed with respect to the threshold levels. A combined threshold severity level associated with the safety threshold levels is determined and code is executed with respect to the safety threshold levels. A combined clustering level associated with the safety threshold levels is determined and a difference value between the combined threshold severity level and combined clustering level is generated. A relationship between the difference value and a threshold value is determined and automated software and hardware control systems are (Continued)

enabled for controlling machinery associated with the mining process resulting in operation of the machinery.

18 Claims, 11 Drawing Sheets

(51) Int. Cl.
*G06N 5/02* (2023.01)
*G08B 21/18* (2006.01)

(56) References Cited

U.S. PATENT DOCUMENTS

| | | | | |
|---|---|---|---|---|
| 11,036,199 B2* | 6/2021 | Kawanoue | ............ | G05B 19/058 |
| 2015/0278407 A1 | 10/2015 | Vennelakanti et al. | | |
| 2016/0292591 A1* | 10/2016 | Guirguis | ................ | G06N 20/20 |

FOREIGN PATENT DOCUMENTS

| | | |
|---|---|---|
| CN | 106194262 B | 5/2018 |
| CN | 109558976 A | 4/2019 |
| CN | 109918696 A | 6/2019 |
| CN | 110298503 A | 10/2019 |
| CN | 110609324 A | 12/2019 |
| CN | 109653800 B | 4/2020 |
| CN | 108798785 B | 6/2020 |
| GB | 2352046 A | 1/2001 |
| RU | 2723805 C1 | 6/2020 |
| WO | 2010039342 A1 | 4/2010 |
| WO | 2013053978 A1 | 4/2013 |

OTHER PUBLICATIONS

Sandvik, Automine Multi-Lite 2, Dec. 31, 2019, XP055941554, Retrieved from Internet: URL:Automine Mutli-Lite 2https:// www.rocktechnology.sandvikproductspdfCiteNPLDOCS [retrieved on Jul. 12, 2022], 28 pages.

Mell, Peter et al.; "The NIST Definition of Cloud Computing;" National Institute of Standards and Technology; Special Publication 800-145; Sep. 2011; 7 pages.

* cited by examiner

AUTOMATED PRESSURE LEVEL DETECTION AND CORRECTION

BACKGROUND

The present invention relates generally to a method for automatically detecting pressure level attributes and in particular to a method and associated system for improving software and hardware detection technology associated with sensing measurements associated with a machine implemented process, generating alarm attributes, and enabling hardware machinery associated with the machine implemented process resulting in operation of the hardware machinery. Typical mining processes include inaccurate safety issue warning systems. The typical warning systems are manually controlled thereby allowing for human error. Likewise, an inaccurate evaluation of multi-parameter impact level mining operations may be associated with few strong impact data samples thereby causing data imbalance within a warning prediction system. Data imbalance causes a mining operation safety to yield inaccurate results which may cause safety issues at a mining location Therefore, system 100 is configured to predict a percussive ground pressure level based on a severity principle and enrich important label data of the percussive ground pressure warning level by using cognitive artificial intelligence (AI) algorithms for predicting an accurate warning level associated with a percussive ground pressure within a mining process.

SUMMARY

A first aspect of the invention provides an automated pressure level detection and correction method comprising: retrieving, by a processor of a hardware device from a plurality of hardware sensors, a plurality of measurement attributes associated with geological conditions occurring during a mining process; determining, by the processor, safety threshold levels configured to activate an alarm associated with the plurality of measurement attributes exceeding the safety threshold levels; executing, by the processor, threshold severity code with respect to the safety threshold levels; determining, by the processor in response to the executing the threshold severity code, a combined threshold severity level associated with the safety threshold levels; executing, by the processor, clustering code with respect to the safety threshold levels; determining, by the processor in response to the executing the clustering code, a combined clustering level associated with the safety threshold levels; determining, by the processor, a difference value between the combined threshold severity level and the combined clustering level; determining, by the processor, a relationship between the difference value and a specified threshold value; and enabling, by the processor based on the relationship, automated software and hardware control systems controlling hardware machinery associated with executing the mining process resulting in operation of the hardware machinery.

Some embodiments of the invention further provide a process for discarding or assigning the difference value between the combined threshold severity level and the combined clustering level. Likewise, some embodiments of the invention are configured to operationally activate hardware machinery performing mining functions associated with the mining process and determine an alarm level associated with activating an alarm when safety threshold levels exceed the alarm level such that the hardware machinery is automatically disabled. These embodiments advantageously provide an effective means for safely operating and disabling mining machinery and operation depending on a predicted ground level pressure.

A second aspect of the invention provides a computer program product, comprising a computer readable hardware storage device storing a computer readable program code, the computer readable program code comprising an algorithm that when executed by a processor of a hardware device implements an automated pressure level detection and correction method, the method comprising: retrieving, by the processor from a plurality of hardware sensors, a plurality of measurement attributes associated with geological conditions occurring during a mining process; determining, by the processor, safety threshold levels configured to activate an alarm associated with the plurality of measurement attributes exceeding the safety threshold levels; executing, by the processor, threshold severity code with respect to the safety threshold levels; determining, by the processor in response to the executing the threshold severity code, a combined threshold severity level associated with the safety threshold levels; executing, by the processor, clustering code with respect to the safety threshold levels; determining, by the processor in response to the executing the clustering code, a combined clustering level associated with the safety threshold levels; determining, by the processor, a difference value between the combined threshold severity level and the combined clustering level; determining, by the processor, a relationship between the difference value and a specified threshold value; and enabling, by the processor based on the relationship, automated software and hardware control systems controlling hardware machinery associated with executing the mining process resulting in operation of the hardware machinery.

Some embodiments of the invention further provide a computer program product for implementing a process for discarding or assigning the difference value between the combined threshold severity level and the combined clustering level. Likewise, some embodiments of the invention are configured to operationally activate hardware machinery performing mining functions associated with the mining process and determine an alarm level associated with activating an alarm when safety threshold levels exceed the alarm level such that the hardware machinery is automatically disabled. These embodiments advantageously provide an effective means for safely operating and disabling mining machinery and operation depending on a predicted ground level pressure.

A third aspect of the invention provides a hardware device comprising a processor coupled to a computer-readable memory unit, the memory unit comprising instructions that when executed by the processor implements an automated pressure level detection and correction method comprising: retrieving, by the processor from a plurality of hardware sensors, a plurality of measurement attributes associated with geological conditions occurring during a mining process; determining, by the processor, safety threshold levels configured to activate an alarm associated with the plurality of measurement attributes exceeding the safety threshold levels; executing, by the processor, threshold severity code with respect to the safety threshold levels; determining, by the processor in response to the executing the threshold severity code, a combined threshold severity level associated with the safety threshold levels; executing, by the processor, clustering code with respect to the safety threshold levels; determining, by the processor in response to the executing the clustering code, a combined clustering level associated with the safety threshold levels; determining, by the processor, a difference value between the combined threshold severity level and the combined clustering level; determining, by the processor, a relationship between the difference value and a specified threshold value; and enabling, by the processor based on the relationship, automated software and hardware control systems controlling hardware machinery associated with executing the mining process resulting in operation of the hardware machinery.

Some embodiments of the invention further provide a hardware device for implementing a process for discarding or assigning the difference value between the combined threshold severity level and the combined clustering level. Likewise, some embodiments of the invention are configured to operationally activate hardware machinery performing mining functions associated with the mining process and determine an alarm level associated with activating an alarm when safety threshold levels exceed the alarm level such that the hardware machinery is automatically disabled. These embodiments advantageously provide an effective means for safely operating and disabling mining machinery and operation depending on a predicted ground level pressure.

The present invention advantageously provides a simple method and associated system capable of automatically detecting pressure level attributes for implementing a safety process.

DETAILED DESCRIPTION

Figure 1:
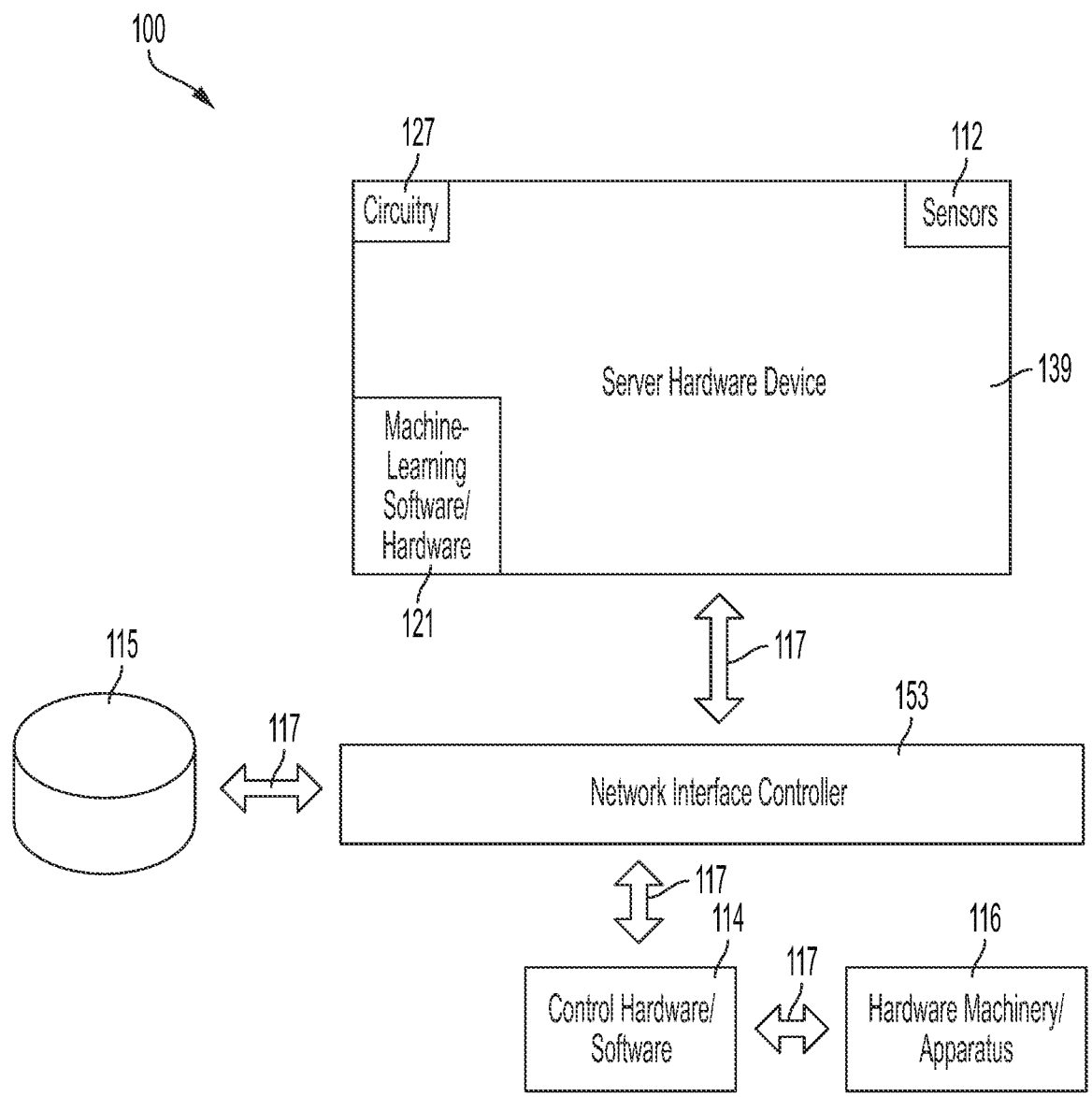
FIG. 1 illustrates a system for improving software and hardware detection technology associated with sensing measurements associated with a mining process, generating associated alarm attributes, and enabling a hardware machinery/apparatus associated with the mining process, in accordance with embodiments of the present invention.

FIG. 1 illustrates a system 100 for improving software and hardware detection technology associated with sensing measurements associated with a mining process, generating associated alarm attributes, and enabling a hardware machinery/apparatus 116 associated with the mining process, in accordance with embodiments of the present invention. Typical rock burst mining processes (e.g., coal mining) may be associated with dangerous conditions that may include sudden and disruptive reactions. Likewise, as a mining depth increases, a frequency and intensity of a mining caused earthquake may increase thereby enabling unsafe production during a mining process. Current warning-based solutions may include single index threshold warning and multi-parameter warning processes such that a threshold level of each determined dimension may be determined via artificial research. Likewise, the aforementioned methods may include increased dependence with respect to human factors thereby increasing a workload for worker entities. Associated multi-dimensional big data processes may be implemented to enable impact level prediction scenarios. However, a principle associated with an inaccurate evaluation of multi-parameter impact level processes may be associated with few strong impact data samples, thereby causing causes a data imbalance. Therefore, system 100 is configured to execute a clustering algorithm (and associated code) for simultaneously enriching and improving precious data samples with respect to impact. Subsequently, a multiple verification process is executed to ensure an improved accuracy with respect to a multi-dimensional data impact level. Associated data modeling processes may be implemented for resolving an error caused by the heavy dependence of human factors with respect to cost reductions and increased safety.

System 100 of FIG. 1 includes a server hardware device 139 (i.e., specialized hardware), control hardware/software 114, hardware machinery/apparatus 116 (e.g., capable of being operationally controlled such as a drilling apparatus, excavation equipment, a robotic device, etc.), a database 115, and a network interface controller 153 interconnected through a network 117. Server hardware device 139 includes specialized circuitry 127 (that may include specialized software), sensors 112, and machine learning software code/hardware structure 121 (i.e., including machine learning software code). Hardware machinery/apparatus 116 may include, inter alia, mining drills, blasting tools, earth movers, rock crushing equipment, feed and conveyer belt equipment, etc. Hardware machinery/apparatus 116 may comprise remotely operated (via control apparatus/software 114) equipment. Network interface controller 153 may include any type of device or apparatus for securely interfacing hardware and software to a network. Sensors 112 may include any type of internal or external sensor including, inter alia, ultrasonic three-dimensional sensor modules, a temperature sensor, an ultrasonic sensor, an optical sensor, a video retrieval device, an audio retrieval device, humidity sensors, voltage sensors, pressure sensors, etc. Control hardware/software 114 is configured to command and control operation with respect to hardware machinery/apparatus 116. Hardware machinery/apparatus 116 may comprise any type of apparatus capable of accepting commands and control signals for controlling operational functions with respect to a mining process. Server hardware device 139 and control hardware/software 114 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 139 and control hardware/software 114 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-11. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software and hardware detection technology associated with sensing measurements associated with a mining process, generating associated alarm attributes, and enabling hardware machinery/apparatus 116 associated with the mining process. Network 117 may include any type of network including, inter alia, a 5G telecom network, a local area network, (LAN), a wide area network (WAN), the Internet, a wireless network, etc. Alternatively, network 117 may include an application programming interface (API).

System 100 is enabled to execute a process for predicting a percussive ground pressure level (e.g., during a mining process such as coal mining) based on a severity principle and enriching important label data associated with a percussive ground pressure warning level via usage of cognitive artificial intelligence (AI) algorithms configured for predicting a warning level of percussive ground pressure associated with a mining process. Likewise, system 100 enables the following features:

A first feature includes a process for obtaining expert thresholds with respect to differing levels corresponding to data related to each dimension of each working mining location at each moment in time. Subsequently, a multi-dimensional alarm level is determined and an associated threshold level is generated as an output with respect to a principle of maximization. A related maximizing rule matching process includes the following steps:
1. Four levels associated with expert thresholds are entered into system 100. The four levels correspond to micro seismic attributes, stress attributes, mining attributes, cutting attributes, and geological data attributes associated with the mining process.
2. Warning levels corresponding to the aforementioned attributes are generated based on the thresholds associated with the four levels.
3. A final threshold level is generated. The final threshold level is associated with the warning levels and the principle of maximization.

A second feature includes a process for combining digital data associated with various dimensions in accordance with a space-time relationship. The digital data is extracted via specialized code and specialized clustering code is configured to generate an output associated with a final clustering level. The final clustering level is associated with an impact pressure clustering process including the following steps:
1. Digital data associated with 5 dimensions (including micro seismic, stress, geology, mining, drilling cuttings, etc.) is inputted into the system (e.g., system 100 of FIG. 1).
2. The 5 dimensions of the digital data are combined in accordance with a specified time (i.e., an occurrence time) and space (i.e., an occurrence location-working surface).
3. Multi-dimensional training data sets are generated in response to steps 1 and 2.
4. The multi-dimensional training data sets are clustered and digitally filtered.
5. A clustering level corresponding to each piece of digital data is presented to a user or entity.

A third feature includes a process for determining an absolute value of a difference between clustering levels based on a threshold level and cluster level. If the absolute value is less than or equal to 1 an associated maximum level is outputted. If the absolute value is greater than 1, associated data is discarded. Results the aforementioned merging process is as follows: (a) diff=|threshold level−clustering level|; (b) if diff<=1 max (threshold level, clustering level); and (c) if diff>1 discard data.

The aforementioned process for enriching training data samples (e.g., associated with strong and medium shocks of an earthquake) improves current processes for rectifying an inaccurate evaluation implemented via multi-parameter experts.

Figure 2:
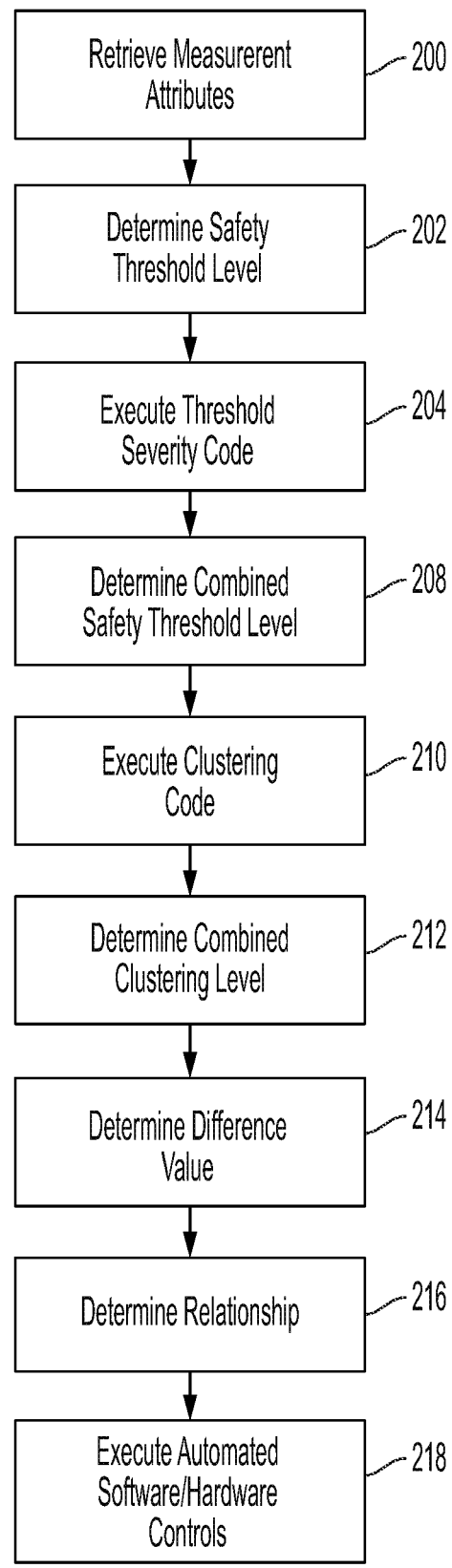
FIG. 2 illustrates an algorithm detailing a process flow enabled by the system of FIG. 1 for improving software and hardware detection technology associated with sensing measurements associated with a mining process, generating associated alarm attributes, and enabling a hardware machinery/apparatus associated with the mining process, in accordance with embodiments of the present invention.

FIG. 2 illustrates an algorithm detailing a process flow enabled by system 100 of FIG. 1 for improving software and hardware detection technology associated with sensing measurements associated with a mining process, generating alarm attributes, and enabling hardware machinery associated with performing the mining process, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 139, control hardware/software 114, and hardware machinery/apparatus 116. In step 200, measurement attributes associated with geological conditions occurring during a mining process are retrieved via hardware sensors placed at a location of the mining process. The geological conditions may include, inter alia, pressure conditions, wave conditions, drill cutting conditions, mining conditions, specified geology conditions, etc.

In step 202, safety threshold levels are determined. The safety threshold levels are configured to activate an alarm when the measurement attributes exceed the safety threshold levels. In step 204, threshold severity code is executed with respect to the safety threshold levels. In step 208, a combined threshold severity level associated with the safety threshold levels is determined in response to step 204. Determining the combined threshold severity level may include determining multiple alarm levels associated with the safety threshold levels. The combined threshold severity level may be determined based on the multiple alarm levels.

In step 210, clustering code is executed with respect to the safety threshold levels. In step 212, a combined clustering level associated with the safety threshold levels is determined in response to executing clustering code. Determining the combined clustering level may include generating multidimensional data training sets and associated code with respect to an occurrence time and an occurrence space of retrieving the measurement attributes at a location of the mining process. The combined clustering level may be determined based on the multidimensional data training sets.

In step 214, a difference value between the combined threshold severity level and the combined clustering level is determined. In step 216, a relationship between the difference value and a specified threshold value is determined. If the relationship includes the difference value exceeding the specified threshold value, the difference value is discarded. If the relationship includes the difference value being less than the specified threshold value, the difference value is assigned as a maximum threshold severity level and clustering level.

In step 218, automated software and hardware control systems are enabled (in response to step 216) for controlling hardware machinery associated with executing the mining process resulting in operation of the hardware machinery. Enabling control of the hardware machinery associated with the mining process may include operationally activating (until the alarm is activated) the hardware machinery performing mining functions (e.g., drilling, blasting, rock crushing, excavating, etc.) associated with the mining process. Additionally, an alarm level associated with activating the alarm may be determined such that the alarm is activated when safety threshold levels exceed the alarm level thereby enabling a process for automatically disabling the hardware machinery.

Figure 3:
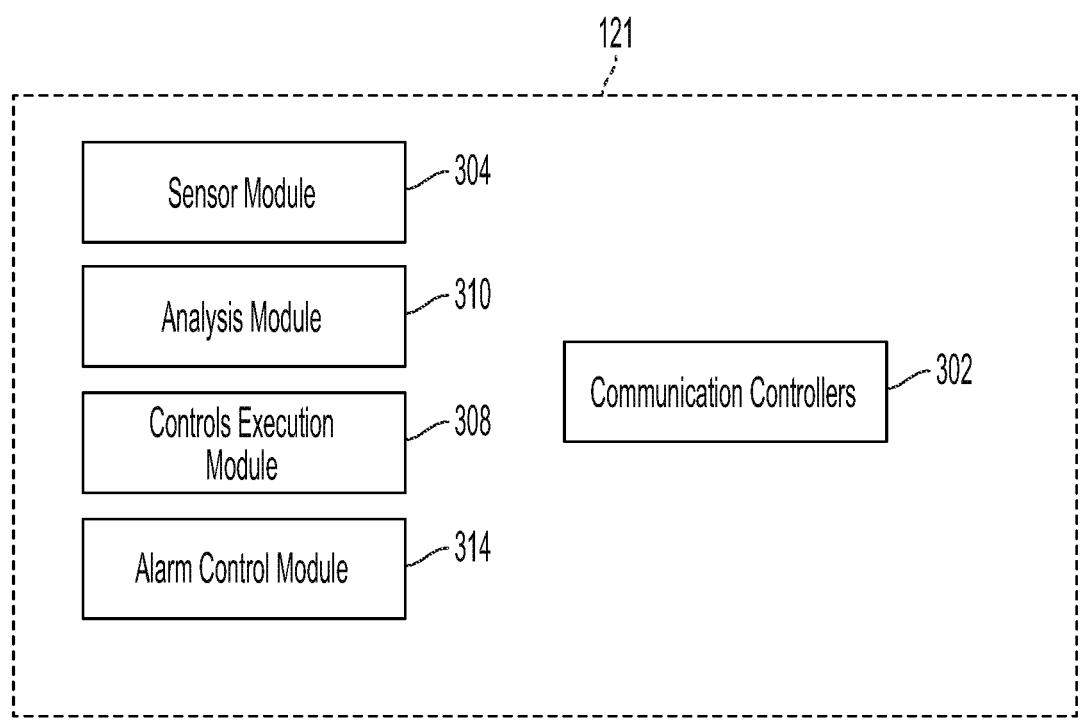
FIG. 3 illustrates an internal structural view of the machine learning software/hardware structure and/or the circuitry/software of FIG. 1, in accordance with embodiments of the present invention.

FIG. 3 illustrates an internal structural view of machine learning software/hardware structure 121 (and/or circuitry 127) of FIG. 1, in accordance with embodiments of the present invention. Machine learning software/hardware structure 121 includes a sensor module 304, an analysis module 310, a controls execution module 308, an alarm control module 314, and communication controllers 302. Sensor module 304 comprises specialized hardware and software for controlling all functions related to the sensor related steps of FIGS. 1 and 2. Analysis module 310 comprises specialized hardware and software for controlling all functionality related to the analysis and determining steps of FIG. 2. Controls execution module 308 comprises specialized hardware and software for controlling all functions related to the automated mining hardware machinery control steps of FIG. 2. Alarm control module 314 comprises specialized hardware and software for controlling all functions related to generating and activating alarms as described with respect to the algorithm of FIG. 2. Communication controllers 302 are enabled for controlling all communications between sensor module 304, analysis module 310, controls execution module 308, and alarm control module 314.

Figure 4:
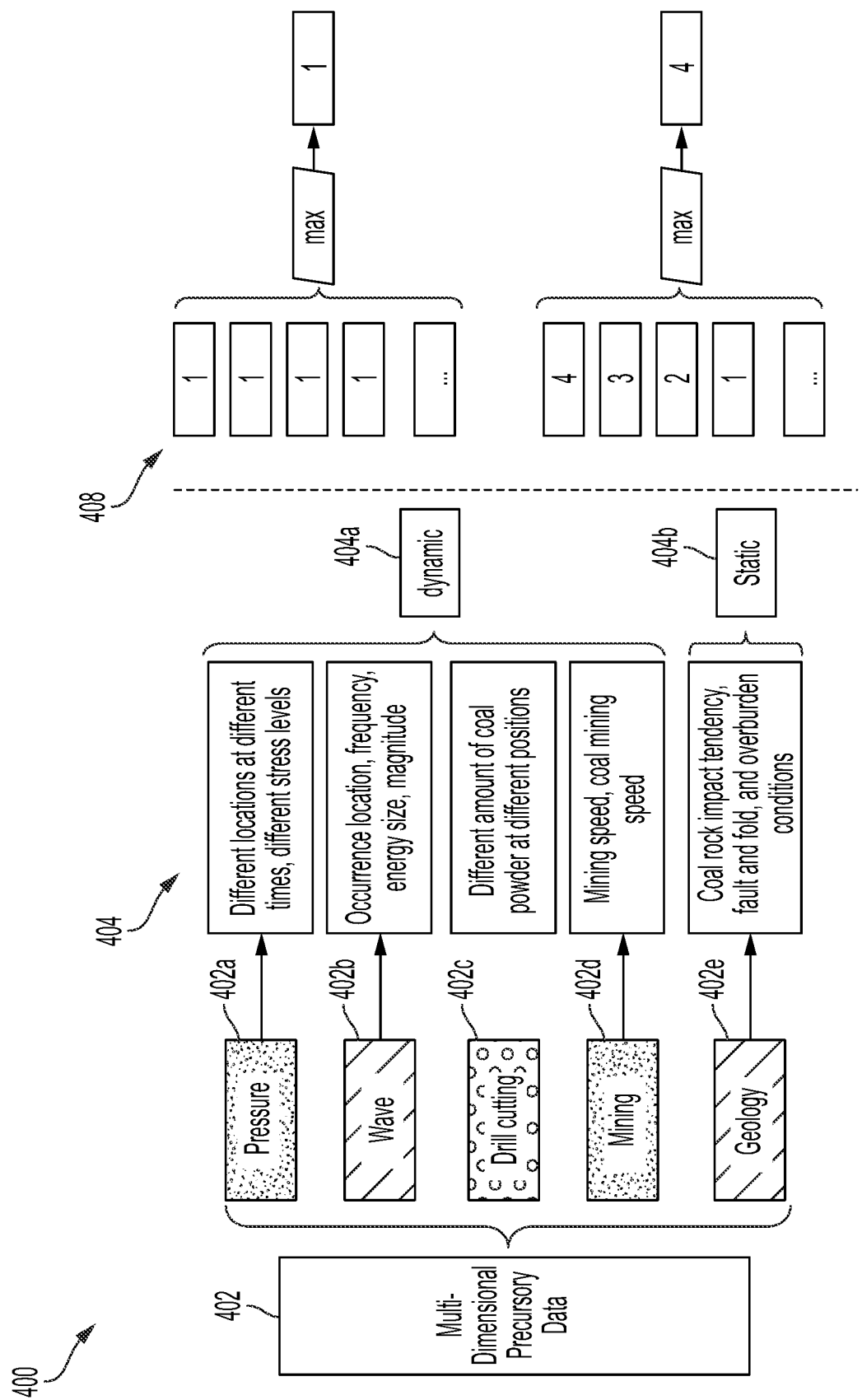
FIG. 4 illustrates a system 400 for determining mining related attributes and thresholds for safely operating a mining process, in accordance with embodiments of the present invention.

FIG. 4 illustrates a system 400 for determining mining related attributes and thresholds for safely operating a mining process, in accordance with embodiments of the present invention. System 100 is configured to obtain expert thresholds (from sensor retrieved data 402 including pressure data 402a, wave-based data 402b, drill cutting data 402c, mining data 402d, and geology data 402e) at different levels 404 (dynamic 404a and static 404b) corresponding to the data of each dimension at a mining working face at each moment in time. Subsequently, a multi-dimensional alarm level is determined and the threshold level is outputted in accordance with a principle of maximization. Likewise, data of various dimensions are combined in accordance with a space-time relationship and data is extracted via usage of a clustering algorithm for output with respect to a final clustering level. In response, an absolute value 408 of a difference value between a threshold level and a cluster level is determined. If the absolute value 408 is less than or equal to 1, a maximum level is outputted. If the absolute value 408 is greater than 1, the data is discarded.

Figure 5:
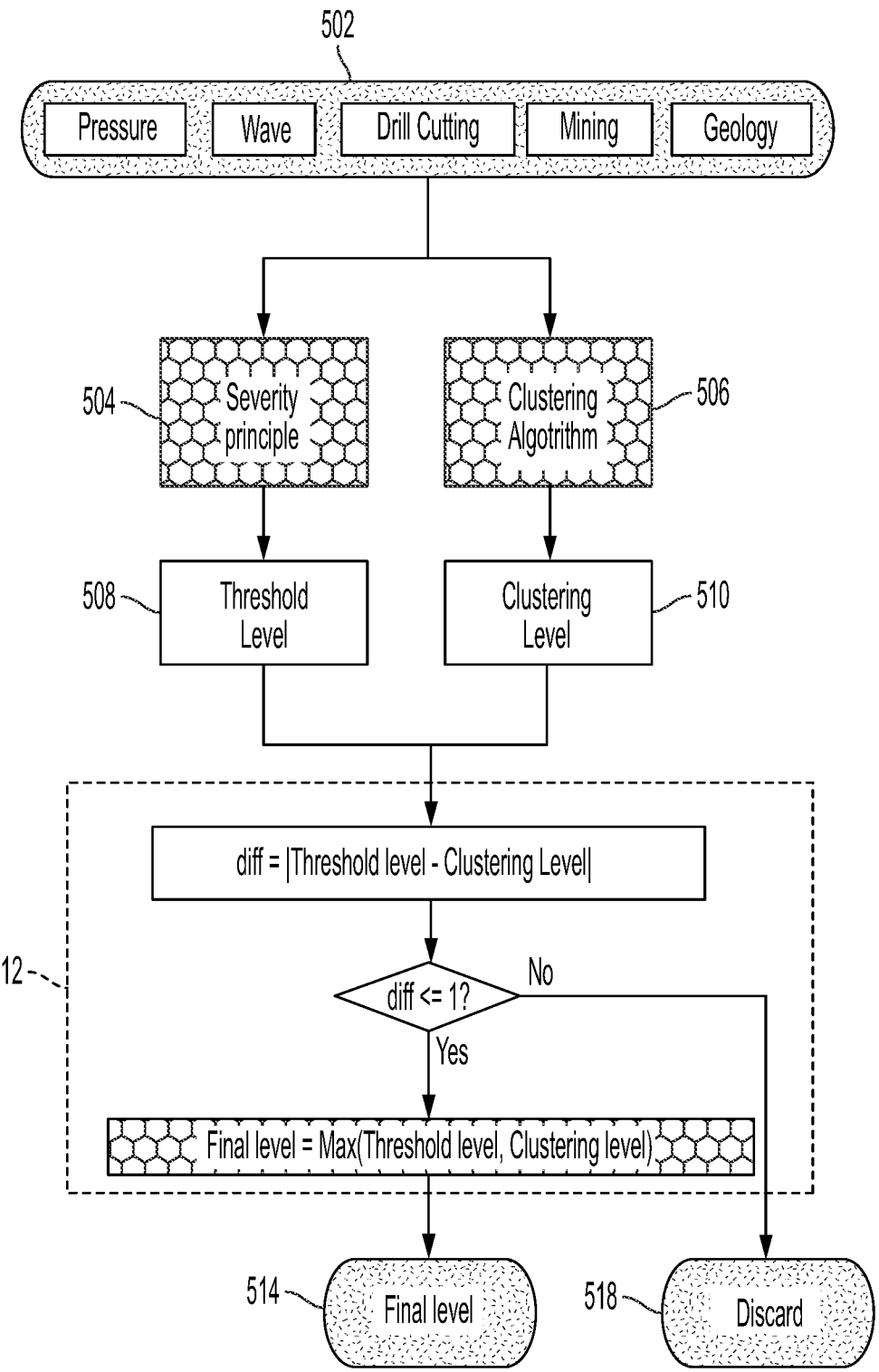
FIG. 5 illustrates an algorithm enabled by the system of FIG. 4 for automatically detecting pressure level attributes and generating an associated alarm with respect to potentially unsafe conditions, in accordance with embodiments of the present invention.

FIG. 5 illustrates an algorithm enabled by the system of FIG. 4 for automatically detecting pressure level attributes and generating an associated alarm with respect to potentially unsafe conditions, in accordance with embodiments of the present invention. In step 502, mining related attributes are retrieved via sensors. In steps 504 and 508, severity principal code is executed for determining a threshold level. In steps 506 and 510, clustering level code is executed for determining a clustering level. In step 512, a difference level (and associated absolute value) between the clustering level and the threshold level is determined and compared to an additional value to determine a final level for use or discarding depending on the value.

Figure 6:
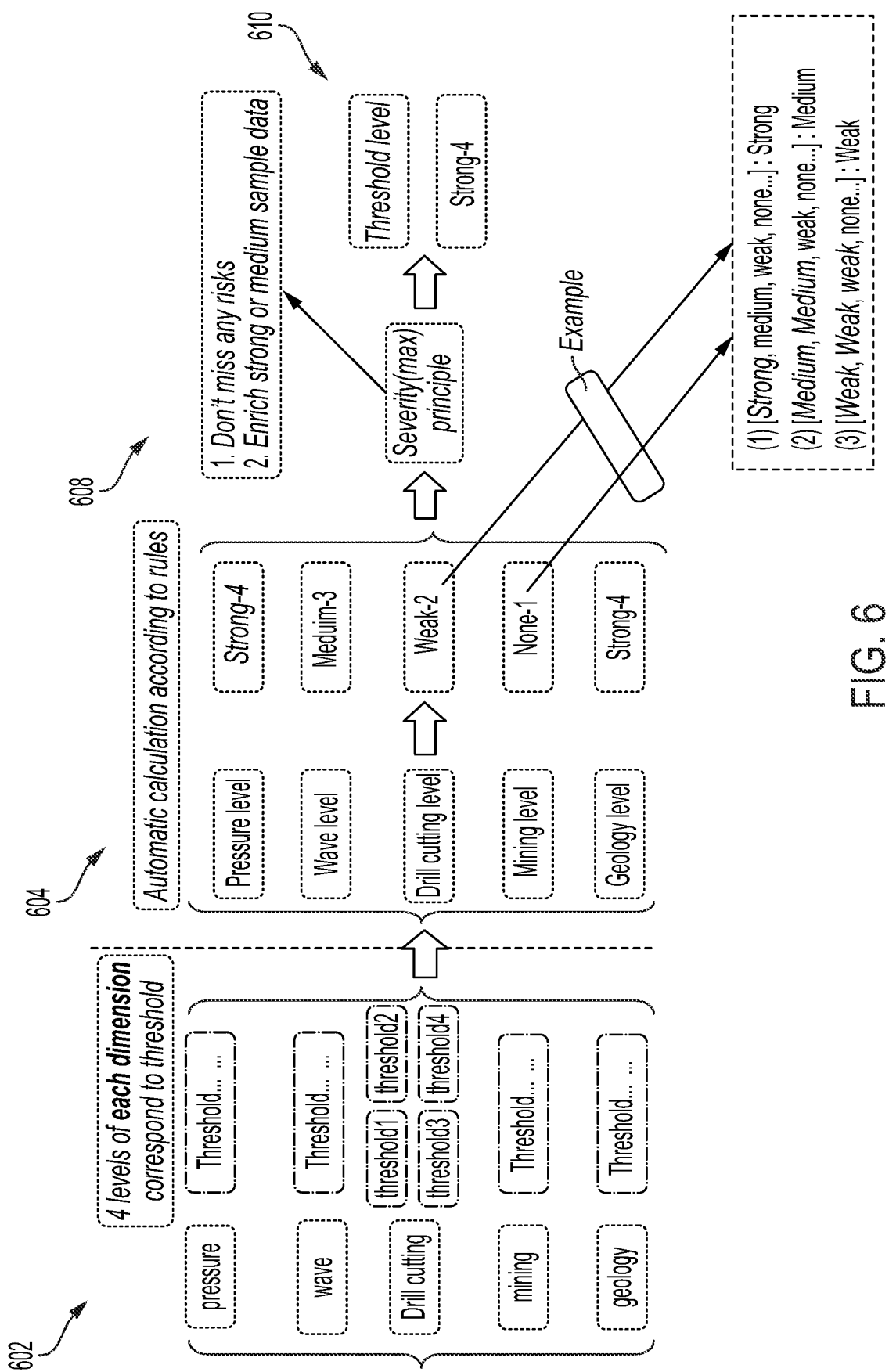
FIG. 6 illustrates execution of a first step of the algorithm of FIG. 5 for determining a threshold level, in accordance with embodiments of the present invention.

FIG. 6 illustrates execution of step 504 of the algorithm of FIG. 5 for determining a threshold level, in accordance with embodiments of the present invention. In step 602, 4 levels of expert thresholds (retrieved from experts and sensors) are entered into the system. The 4 levels are associated with pressure, wave, mining, cutting, and geological data. In step 604 (based on the thresholds of the 4 levels) warning levels are determined. The warning levels are associated with the aforementioned 5 dimensions (i.e., pressure, wave, mining, cutting, and geological data). In step 608, threshold levels are determined in accordance with a warning level of 5 dimensions with respect to principle of maximization. The final threshold level is outputted with respect to the 5 dimensions.

Figure 7:
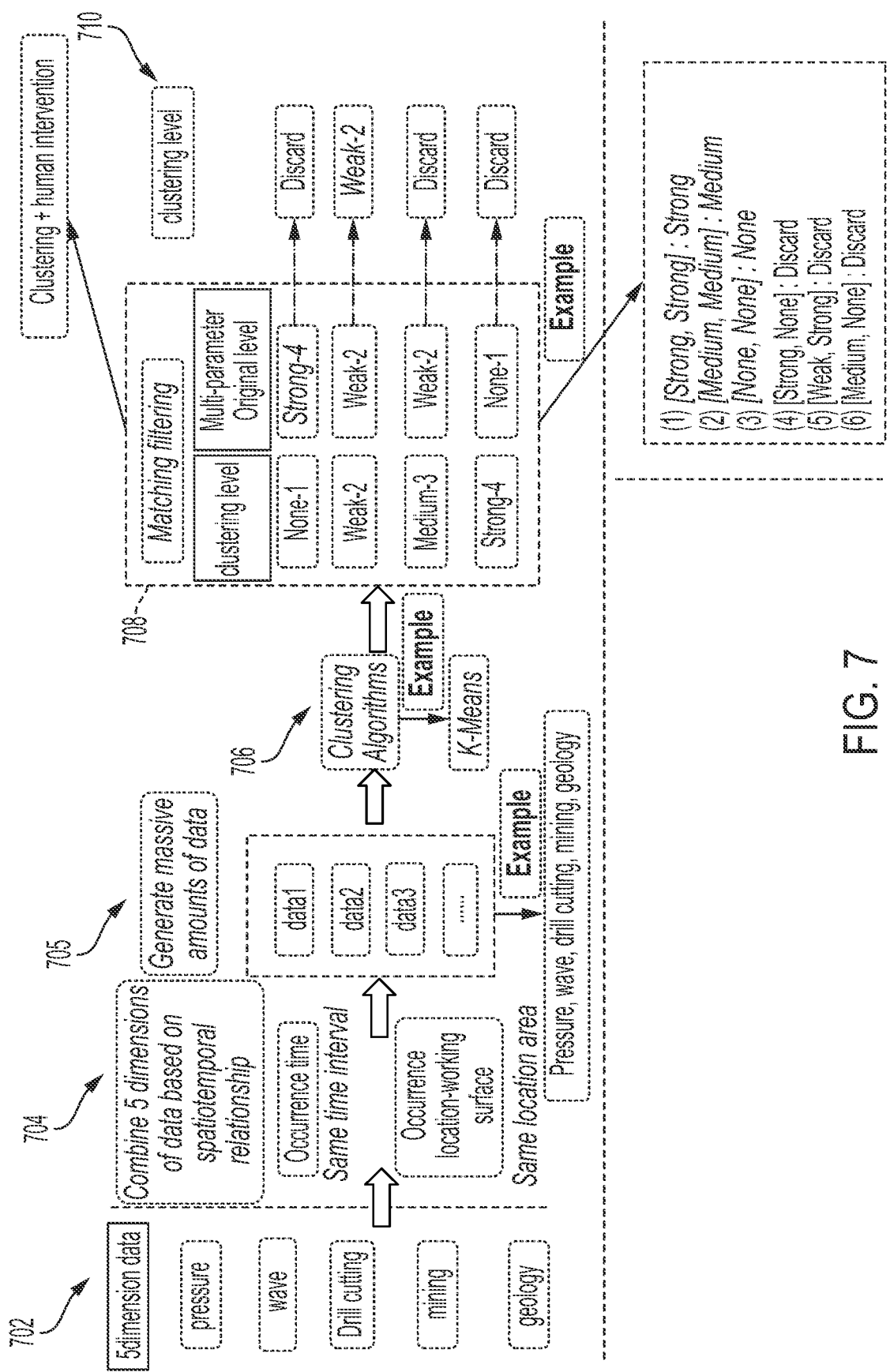
FIG. 7 illustrates execution of second step of the algorithm of FIG. 5 for determining a clustering level, in accordance with embodiments of the present invention.

FIG. 7 illustrates execution of step 506 of the algorithm of FIG. 5 for determining a clustering level, in accordance with embodiments of the present invention. In step 702, data associated with the aforementioned 5 dimensions of data (including pressure, wave, geology, mining, and drilling cutting) is entered into the system. In step 704, the 5 dimensions of data are merged in accordance with an occurrence time and space (occurrence location-working surface). In step 705, a multi-dimensional massive training data set is generated based on results of steps 702 and 704. In step 706, clustering code is executed with respect to the multi-dimensional massive training data set. In step 708, a determined clustering level and original clustering level are filtered to locate matching attributes and in step 710 a resulting clustering level (for each data portion) is outputted.

Figure 8:
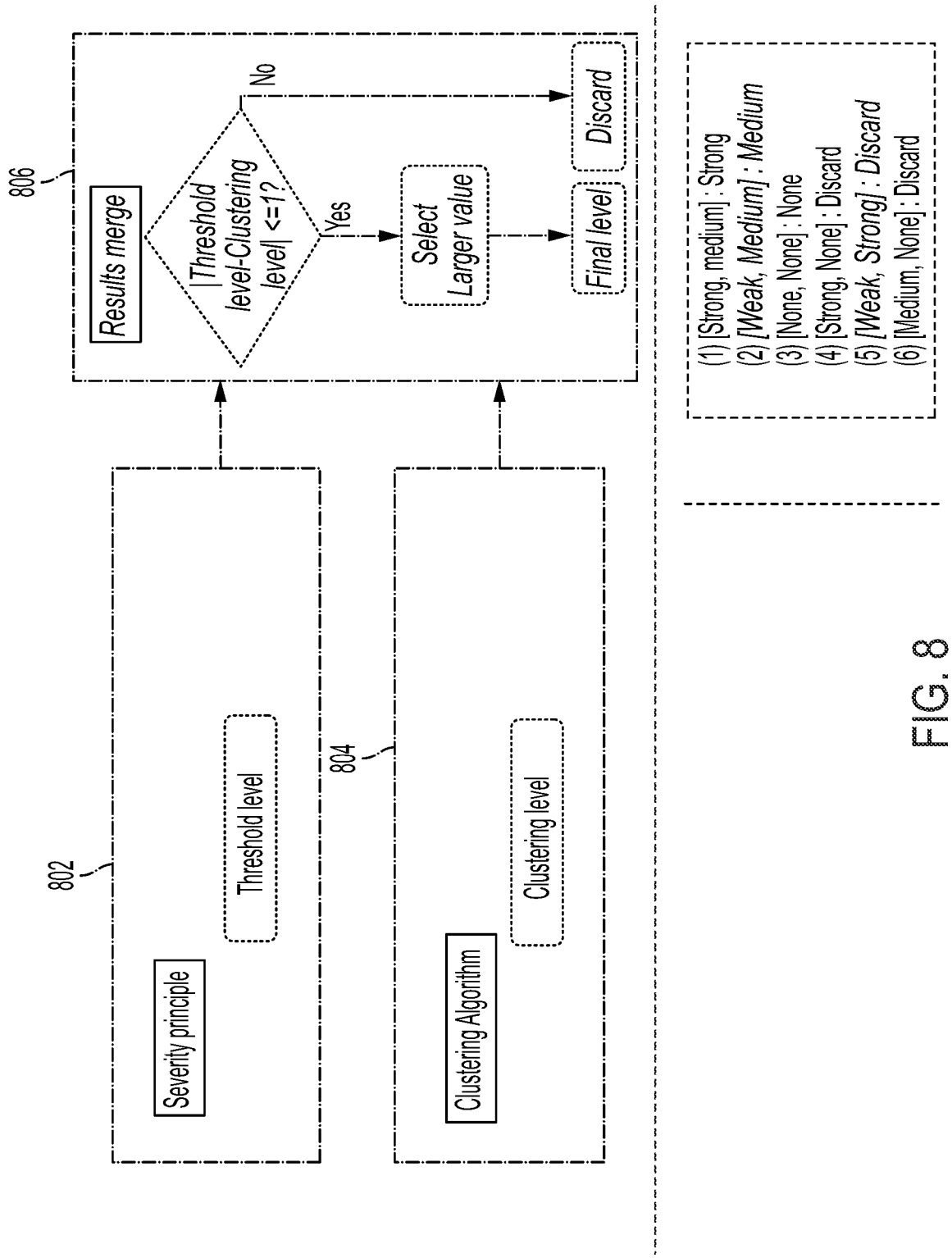
FIG. 8 illustrates execution of a third step of the algorithm of FIG. 5 for determining a final clustering level, in accordance with embodiments of the present invention.

FIG. 8 illustrates execution of step 512 of the algorithm of FIG. 5 for determining a final clustering level, in accordance with embodiments of the present invention. In step 802, the aforementioned threshold level is entered. In step 804, the aforementioned clustering level is entered. In step 806, an absolute value of a difference value between the threshold level and the cluster level is determined. If the absolute value is less than or equal to 1, a maximum level is outputted. If the absolute value is greater than 1, the data is discarded.

Figure 9:
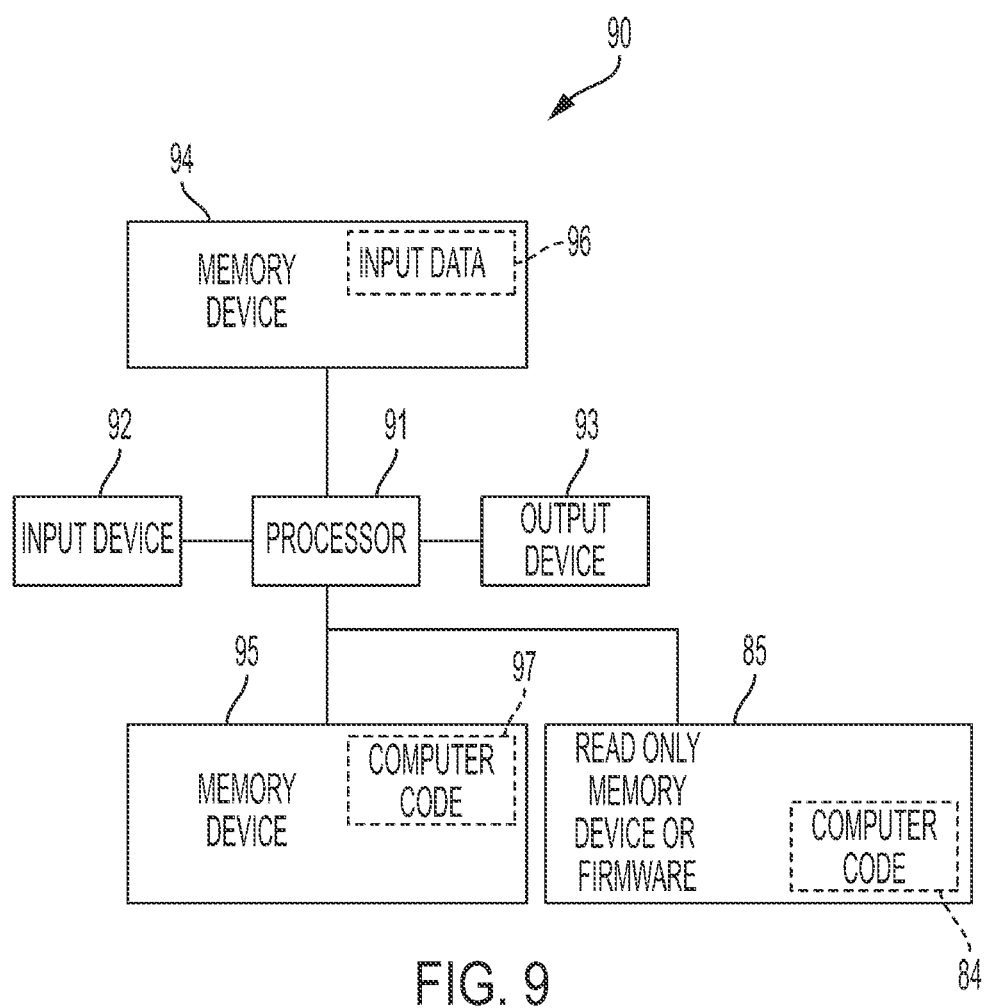
FIG. 9 illustrates a computer system used by the system of FIG. 1 for improving software and hardware detection technology associated with sensing measurements associated with a mining process, generating associated alarm attributes, and enabling a hardware machinery/apparatus associated with the mining process, in accordance with embodiments of the present invention.

FIG. 9 illustrates a computer system 90 (e.g., server hardware device 139 and control hardware/software 114 of FIG. 1) used by or comprised by the system of FIG. 1 for improving software and hardware detection technology associated with sensing measurements associated with a mining process, generating alarm attributes, and enabling hardware machinery associated with performing the mining process, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 9 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithms of FIGS. 2 and 5) for improving software and hardware detection technology associated with sensing measurements associated with a mining process, generating alarm attributes, and enabling hardware machinery associated with performing the mining process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithms of FIGS. 2 and 5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and hardware detection technology associated with sensing measurements associated with a mining process, generating alarm attributes, and enabling hardware machinery associated with performing the mining process. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and hardware detection technology associated with sensing measurements associated with a mining process, generating alarm attributes, and enabling hardware machinery associated with performing the mining process. In another embodiment, the invention provides a business method that performs the process steps of the invention on a subscription, advertising, and/or fee basis. That is, a service supplier, such as a Solution Integrator, could offer to enable a process for improving software and hardware detection technology associated with sensing measurements associated with a mining process, generating alarm attributes, and enabling hardware machinery associated with performing the mining process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a configuration of hardware and software, any configuration of hardware and software, as would be known to a person of ordinary skill in the art, may be utilized for the purposes stated supra in conjunction with the computer system 90 of FIG. 9. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
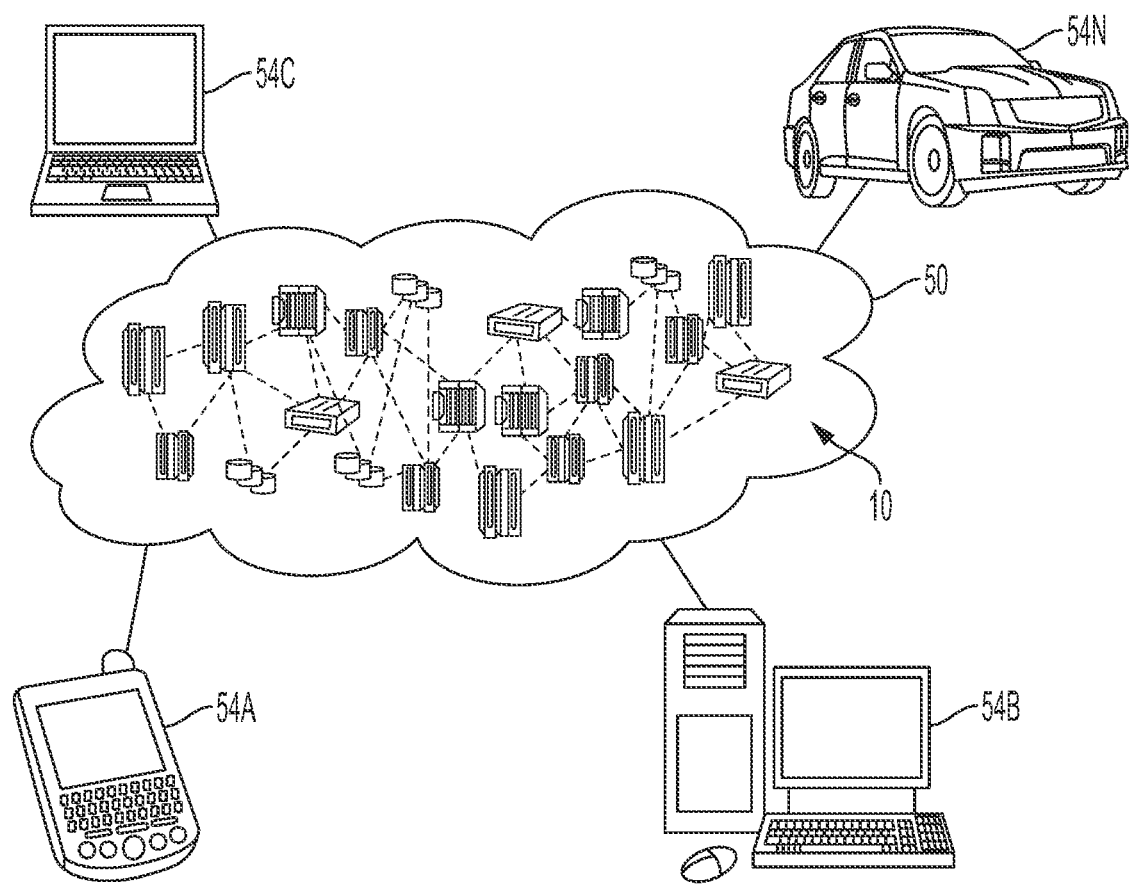
FIG. 10 illustrates a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 11:
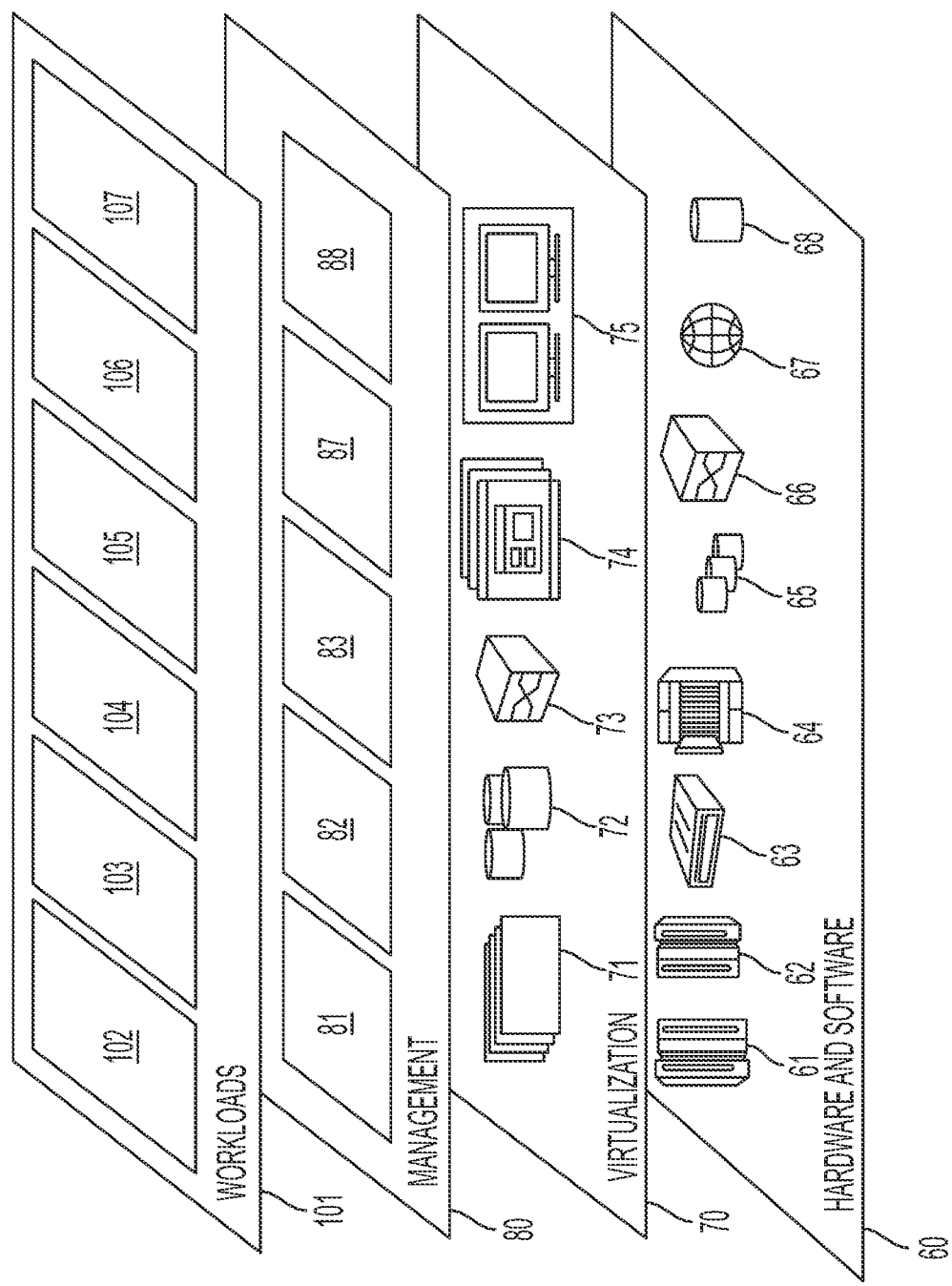
FIG. 11 illustrates a set of functional abstraction layers provided by cloud computing environment, in accordance with embodiments of the present invention.

Referring now to FIG. 11, a set of functional abstraction layers provided by cloud computing environment 50 (see FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and improving software and hardware detection technology associated with sensing measurements associated with a mining process, generating alarm attributes, and enabling hardware machinery associated with performing the mining process 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated pressure level detection and correction method, said method comprising:
retrieving, by a processor of a hardware device from a plurality of hardware sensors, a plurality of measurement attributes associated with geological conditions occurring during a mining process;
executing, by said processor, threshold severity code with respect to safety threshold levels configured to activate an alarm associated with said plurality of measurement attributes exceeding said safety threshold levels;
determining, by said processor, a combined clustering level associated with said safety threshold levels, wherein said determining said combined clustering level comprises: generating, multidimensional data training sets and associated code with respect to an occurrence time and an occurrence space of said retrieving said measurement attributes at a location of said mining process, wherein said combined clustering level is determined based on said multidimensional data training set;
determining, by said processor, a difference value between a combined threshold severity level associated with said safety threshold levels and said combined clustering level;
determining, by said processor, a relationship between said difference value and a specified threshold value; and
enabling, by said processor based on said relationship, automated software and hardware control systems controlling hardware machinery associated with executing said mining process resulting in operation of said hardware machinery.

2. The method of claim 1, wherein said relationship comprises said difference value exceeding said specified threshold value, and wherein said method further comprises:
discarding, by said processor, said difference value.

3. The method of claim 1, wherein said relationship comprises said difference value being less than said specified threshold value, and wherein said method further comprises:
assigning, by said processor, said difference value as a maximum threshold severity level and clustering level.

4. The method of claim 1, wherein said enabling said control of said hardware machinery associated with said mining process comprises operationally activating, until said alarm is activated, said hardware machinery performing mining functions associated with said mining process.

5. The method of claim 1, wherein said geological conditions comprise conditions selected from the group consisting of pressure conditions, wave conditions, drill cutting conditions, mining conditions, and specified geology conditions.

6. The method of claim 1, further comprising:
determining, by said processor, an alarm level associated with activating said alarm when said safety threshold levels exceed said alarm level, wherein said alarm level is configured to automatically disable said hardware machinery.

7. The method of claim 1, said method further comprising:
determining, by said processor, said combined threshold severity level, wherein said determining said combined threshold severity level comprises:
determining, multiple alarm levels associated with said safety threshold levels, wherein said combined threshold severity level is determined based on said multiple alarm levels.

8. The method of claim 1, further comprising:
providing at least one support service for at least one of creating, integrating, hosting, maintaining, and deploying computer-readable code in the hardware device, said code being executed by the computer processor to implement: said retrieving, said executing threshold severity code, said determining said combined clustering level, said determining said difference value, said determining said relationship, and said enabling.

9. A computer program product, comprising a computer readable hardware storage device storing a computer readable program code, said computer readable program code comprising an algorithm that when executed by a processor of a hardware device implements an automated pressure level detection and correction method, said method comprising:
retrieving, by said processor from a plurality of hardware sensors, a plurality of measurement attributes associated with geological conditions occurring during a mining process;
executing, by said processor, threshold severity code with respect to safety threshold levels configured to activate an alarm associated with said plurality of measurement attributes exceeding said safety threshold levels;
determining, by said processor, a combined clustering level associated with said safety threshold levels, wherein said determining said combined clustering level comprises: generating, multidimensional data training sets and associated code with respect to an occurrence time and an occurrence space of said retrieving said measurement attributes at a location of said mining process, wherein said combined clustering level is determined based on said multidimensional data training set;
determining, by said processor, a difference value between a combined threshold severity level associated with said safety threshold levels and said combined clustering level;
determining, by said processor, a relationship between said difference value and a specified threshold value; and
enabling, by said processor based on said relationship, automated software and hardware control systems controlling hardware machinery associated with executing said mining process resulting in operation of said hardware machinery.

10. The computer program product of claim 9, wherein said relationship comprises said difference value exceeding said specified threshold value, and wherein said method further comprises:
discarding, by said processor, said difference value.

11. The computer program product of claim 9, wherein said relationship comprises said difference value being less than said specified threshold value, and wherein said method further comprises:
assigning, by said processor, said difference value as a maximum threshold severity level and clustering level.

12. The computer program product of claim 9, wherein said enabling said control of said hardware machinery associated with said mining process comprises operationally activating, until said alarm is activated, said hardware machinery performing mining functions associated with said mining process.

13. The computer program product of claim 9, wherein said geological conditions comprise conditions selected from the group consisting of pressure conditions, wave conditions, drill cutting conditions, mining conditions, and specified geology conditions.

14. The computer program product of claim 9, wherein said method further comprises:
  determining, by said processor, an alarm level associated with activating said alarm when said safety threshold levels exceed said alarm level, wherein said alarm level is configured to automatically disable said hardware machinery.

15. The computer program product of claim 9, said method further comprising:
  determining, by said processor, said combined threshold severity level, wherein said determining said combined threshold severity level comprises:
  determining, multiple alarm levels associated with said safety threshold levels, wherein said combined threshold severity level is determined based on said multiple alarm levels.

16. A hardware device comprising a processor coupled to a computer-readable memory unit, said memory unit comprising instructions that when executed by the processor implements an automated pressure level detection and correction method comprising:
  retrieving, by said processor from a plurality of hardware sensors, a plurality of measurement attributes associated with geological conditions occurring during a mining process;
  executing, by said processor, threshold severity code with respect to safety threshold levels configured to activate an alarm associated with said plurality of measurement attributes exceeding said safety threshold levels;
  determining, by said processor, a combined clustering level associated with said safety threshold levels, wherein said determining said combined clustering level comprises: generating, multidimensional data training sets and associated code with respect to an occurrence time and an occurrence space of said retrieving said measurement attributes at a location of said mining process, wherein said combined clustering level is determined based on said multidimensional data training set;
  determining, by said processor, a difference value between a combined threshold severity level associated with said safety threshold levels and said combined clustering level;
  determining, by said processor, a relationship between said difference value and a specified threshold value; and
  enabling, by said processor based on said relationship, automated software and hardware control systems controlling hardware machinery associated with executing said mining process resulting in operation of said hardware machinery.

17. The hardware device of claim 16, wherein said relationship comprises said difference value exceeding said specified threshold value, and wherein said method further comprises:
  discarding, by said processor, said difference value.

18. The hardware device of claim 16, wherein said relationship comprises said difference value being less than said specified threshold value, and wherein said method further comprises:
  assigning, by said processor, said difference value as a maximum threshold severity level and clustering level.

\* \* \* \* \*